United States Patent
Nakai et al.

(10) Patent No.: US 10,150,427 B2
(45) Date of Patent: Dec. 11, 2018

(54) IMAGING UNIT SUPPORT STRUCTURE

(71) Applicants: KABUSHIKI KAISHA TOKAI-RIKA-DENKI-SEISAKUSHO, Aichi (JP); TOYOTA JIDOSHA KABUSHIKI KAISHA, Aichi (JP)

(72) Inventors: Toshinari Nakai, Aichi (JP); Masahide Inayama, Aichi (JP); Tomonori Ichikawa, Aichi (JP); Masashi Hanazato, Aichi (JP)

(73) Assignees: KABUSHIKI KAISHA TOKAI-RIKA-DENKI-SEISAKUSHO, Aichi-Ken (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 15/538,527

(22) PCT Filed: Nov. 6, 2015

(86) PCT No.: PCT/JP2015/081931
§ 371 (c)(1),
(2) Date: Jun. 21, 2017

(87) PCT Pub. No.: WO2016/103928
PCT Pub. Date: Jun. 30, 2016

(65) Prior Publication Data
US 2017/0341598 A1 Nov. 30, 2017

(30) Foreign Application Priority Data
Dec. 24, 2014 (JP) .................................. 2014-260485

(51) Int. Cl.
*B60R 1/00* (2006.01)
*B60R 11/04* (2006.01)
(Continued)

(52) U.S. Cl.
CPC ................ *B60R 11/04* (2013.01); *B60R 1/00* (2013.01); *H04N 5/2252* (2013.01);
(Continued)

(58) Field of Classification Search
CPC ..... B60R 11/04; B60R 1/00; B60R 2300/802; H04N 5/2252; H04N 5/2253; H04N 5/247
See application file for complete search history.

(56) References Cited

U.S. PATENT DOCUMENTS 8,179,438 B2 * 5/2012 Hayakawa ........... H04N 5/2254
348/143
9,429,423 B2 * 8/2016 Kimura .................. G02B 7/003
(Continued)

FOREIGN PATENT DOCUMENTS

DE 102012003561 A1 8/2013
DE 102012015395 B3 11/2013
(Continued)

OTHER PUBLICATIONS

Japanese Patent Application No. 2000-108784 Office Action, dated Apr. 8, 2000 and English translation thereof.
(Continued)

*Primary Examiner* — Amy R Hsu
(74) *Attorney, Agent, or Firm* — Roberts Mlotkowski Safran Cole & Calderon P.C.

(57) ABSTRACT

In an imaging device, a stay is supported at a side door of a vehicle, and a camera module is attached to a camera cover. The stay and the camera cover are integrally molded together. This enables a simple configuration.

13 Claims, 4 Drawing Sheets

(51) Int. Cl.
*H04N 5/225* (2006.01)
*H04N 5/247* (2006.01)

(52) U.S. Cl.
CPC ........... *H04N 5/2253* (2013.01); *H04N 5/247* (2013.01); *B60R 2300/802* (2013.01)

(56) References Cited

U.S. PATENT DOCUMENTS

| | | | |
|---|---|---|---|
| 9,888,227 B2* | 2/2018 | Ohsumi | G03B 11/045 |
| 9,912,935 B2* | 3/2018 | Sasada | G03B 35/08 |
| 2002/0003571 A1* | 1/2002 | Schofield | B60C 23/00 |
| | | | 348/148 |
| 2007/0262574 A1* | 11/2007 | Breed | B60R 1/00 |
| | | | 280/735 |
| 2008/0001727 A1* | 1/2008 | Ohsumi | B60R 11/04 |
| | | | 340/436 |
| 2011/0109790 A1* | 5/2011 | Shinohara | G03B 17/14 |
| | | | 348/373 |
| 2011/0267466 A1 | 11/2011 | Brester | |
| 2013/0058120 A1* | 3/2013 | Schutz | B60Q 1/2669 |
| | | | 362/544 |
| 2014/0092495 A1 | 4/2014 | Bowers et al. | |
| 2014/0132739 A1 | 5/2014 | Ohsumi et al. | |
| 2014/0301729 A1* | 10/2014 | Okamura | H04N 5/2252 |
| | | | 396/427 |

FOREIGN PATENT DOCUMENTS

| | | | |
|---|---|---|---|
| JP | 11-301365 A | 11/1999 |
| JP | 2000108784 A | 4/2000 |
| JP | 2002200938 A | 7/2002 |
| JP | 2003-212043 A | 7/2003 |
| JP | 2005-319907 A | 11/2005 |
| JP | 2006-103529 A | 4/2006 |
| JP | 2008-168715 A | 7/2008 |
| JP | 2010-132242 A | 6/2010 |
| JP | 2011-246056 A | 12/2011 |
| JP | 2013-112314 A | 6/2013 |
| JP | 2014-040136 A | 3/2014 |
| JP | 2014133440 A | 7/2014 |
| JP | 2014-231334 A | 12/2014 |
| WO | 2006/052024 A | 5/2006 |

OTHER PUBLICATIONS

Japanese Patent Application No. 2002-200938 Office Action, dated Jul. 16, 2002 and English translation thereof.
Japanese Patent Application No. 2014-133440 Office Action, dated Jul. 24, 2014 and English translation thereof.
International Search Report issued in a corresponding application PCT/JP2015/081391 dated Jan. 19, 2016.
Office Action issued in the corresponding Japanese Application No. 2014-260485 dated Nov. 8, 2016.
Extended European Search Report issued in the corresponding EP application No. 15872497.1 dated May 9, 2018.

* cited by examiner

IMAGING UNIT SUPPORT STRUCTURE

CROSS-REFERENCE TO RELATED APPLICATIONS

The present application is a U.S. National Phase of PCT/JP2015/081391 filed on Nov. 6, 2015 claiming priority to Japanese Patent application No. 2014-260485 filed Dec. 24, 2014. The disclosure of the PCT Application is hereby incorporated by reference into the present Application.

TECHNICAL FIELD

The present invention relates to an imaging device in which an imaging unit is attached to an attachment body.

BACKGROUND ART

In an outer mirror described in Japanese Patent Application Laid-Open (JP-A) No. 2008-168715, a mirror housing is supported at a vehicle body side, and a vehicle camera is attached to an attachment bracket.

Note that in this outer mirror, the attachment bracket is configured separately to the mirror housing.

SUMMARY OF INVENTION

Technical Problem

In consideration of the above circumstances, an object of the present invention is to obtain an imaging device that can be configured simply.

Solution to Problem

An imaging device of a first aspect of the present invention includes: a support body that is supported at a vehicle body side; an attachment body that is integrated with the support body; and an imaging unit that is attached to the attachment body and that is configured to perform imaging.

An imaging device of a second aspect of the present invention is the imaging device of the first aspect of the present invention, wherein the attachment body covers the imaging unit.

An imaging device of a third aspect of the present invention is the imaging device of the first aspect or the second aspect of the present invention, further including: wiring that is connected to the imaging unit; and a housing section that is provided at the support body, that houses the wiring, and that includes a side face with which the wiring is configured to engage in a vertical direction.

An imaging device of a fourth aspect of the present invention is the imaging device of any one of the first aspect to the third aspect of the present invention, wherein a vertical direction dimension of the support body is smaller than a vertical direction dimension of the imaging unit.

An imaging device of a fifth aspect of the present invention is the imaging device of any one of the first aspect to the fourth aspect of the present invention, wherein an upper face of the support body is disposed along a lower face of the support body.

An imaging device of a sixth aspect of the present invention is the imaging device of any one of the first aspect to the fifth aspect of the present invention, wherein the imaging unit is disposed at a vehicle rear side of a vehicle front side face of the support body.

An imaging device of a seventh aspect of the present invention is the imaging device of any one of the first aspect to the sixth aspect of the present invention, wherein the imaging unit is disposed at a lower side of an upper face of the support body.

An imaging device of an eighth aspect of the present invention is the imaging device of any one of the first aspect to the seventh aspect of the present invention, wherein the imaging device includes plural of the imaging units, and the support body is disposed between the imaging units.

Advantageous Effects of Invention

In the imaging device of the first aspect of the present invention, the support body is supported at the vehicle body side, and the imaging unit is attached to the attachment body. The imaging unit is configured to perform imaging.

The attachment body is integrated with the support body. This enables a simple configuration.

In the imaging device of the second aspect of the present invention, the attachment body covers the imaging unit. This enables the input of load to the imaging unit to be limited by the attachment body.

In the imaging device of the third aspect of the present invention, the wiring is connected to the imaging unit, and the housing section is provided at the support body. The housing section houses the wiring.

Note that the wiring is configured to engage with the side face of the housing section in the vertical direction. The wiring can thereby be suppressed from coming out from the housing section.

In the imaging device of the fourth aspect of the present invention, the vertical direction dimension of the support body is smaller than the vertical direction dimension of the imaging unit. This thereby enables air resistance caused by the support body during vehicle travel to be diminished.

In the imaging device of the fifth aspect of the present invention, the upper face of the support body is disposed along the lower face of the support body. The thickness dimension of the support body can accordingly be made smaller.

In the imaging device of the sixth aspect of the present invention, the imaging unit is disposed at the vehicle rear side of the vehicle front side face of the support body. This thereby enables air resistance caused by the imaging unit during vehicle travel to be diminished.

In the imaging device of the seventh aspect of the present invention, the imaging unit is disposed at the lower side of the upper face of the support body. This thereby enables a reduction caused by the imaging unit in the field of view of an occupant to be suppressed.

In the imaging device of the eighth aspect of the present invention, plural of the imaging units are provided, and the support body is disposed between the imaging units. This thereby enables the support strength of the plural imaging units by the support body to be raised.

DESCRIPTION OF EMBODIMENTS

First Exemplary Embodiment

Figure 1:
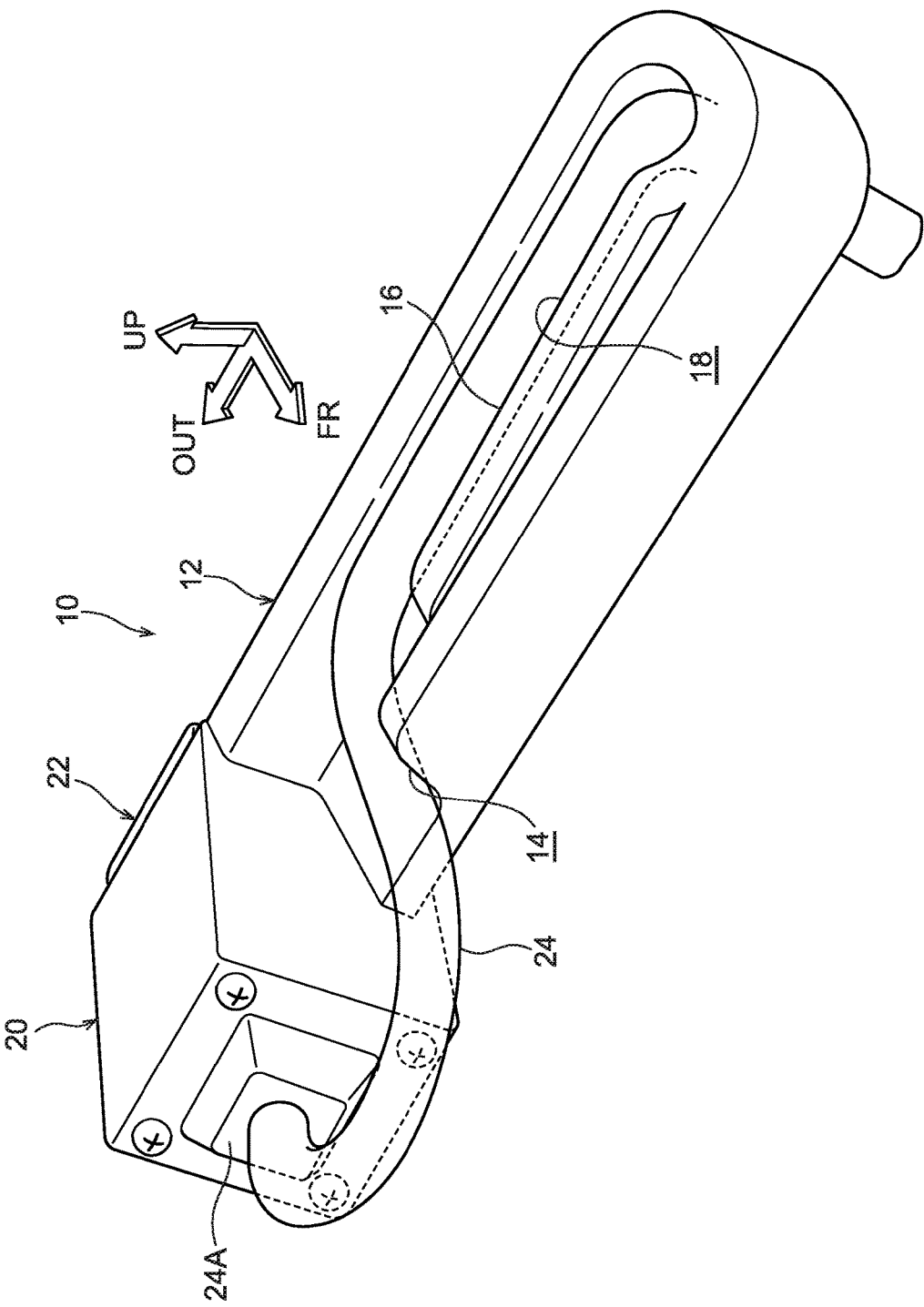
FIG. 1 is a perspective view illustrating an imaging device according to a first exemplary embodiment of the present invention as viewed diagonally from a vehicle upper front.
Figure 2:
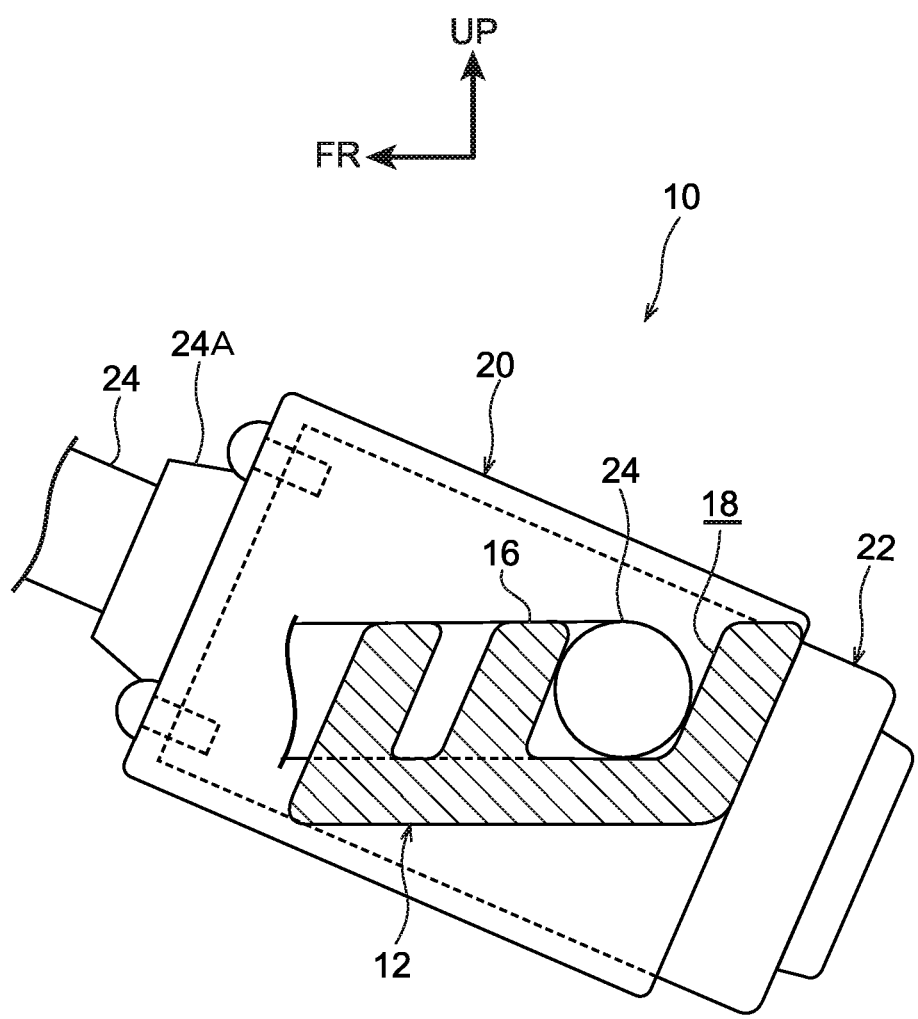
FIG. 2 is a cross-section illustrating an imaging device according to the first exemplary embodiment of the present invention as viewed from a vehicle width direction inner side (vehicle left side).

FIG. 1 is a perspective view illustrating an imaging device 10 according to a first exemplary embodiment of the present invention as viewed diagonally from a vehicle upper front. FIG. 2 is a cross-section illustrating the imaging device 10 as viewed from a vehicle width direction inner side (the vehicle left side). Note that in the drawings, the arrow FR indicates the vehicle front, the arrow OUT indicates the vehicle width direction outer side (vehicle right), and the arrow UP indicates upward.

The imaging device 10 according to the present exemplary embodiment is installed at the outside of a vehicle front side end of a vertical direction intermediate section of a side door (a front side door, not illustrated in the drawings) of a vehicle.

As illustrated in FIG. 1 and FIG. 2, the imaging device 10 includes an elongated, substantially rectangular box shaped stay 12 that is made from metal and serves as a support body. A vehicle width direction inner side end wall of the stay 12 is curved in a semicircular arc shape in plan view, and the interior of the stay 12 is open toward the upper side. A vehicle width direction inner side end portion of the stay 12 is attached to the side door, such that the stay 12 is supported at the side door (vehicle body side) so as to be capable of swinging in the vehicle front-rear direction. The swinging of the stay 12 in the vehicle front-rear direction with respect to the side door is limited such that the stay 12 is permitted to swing in the vehicle front-rear direction when a load of a predetermined load or greater in the vehicle front-rear direction acts on the stay 12 when the stay 12 is extending out toward the vehicle width direction outer side.

A vehicle front side wall and a vehicle rear side wall of the stay 12 are inclined toward the vehicle rear on progression upward, and an upper face and lower wall (upper face and lower face) of the stay 12 are disposed horizontally. The vehicle front side wall of the stay 12 extends in a direction toward the vehicle rear on progression outward in the vehicle width direction, and a vehicle front-rear direction dimension of the stay 12 becomes gradually smaller on progression outward in the vehicle width direction, except for at a vehicle width direction inner side end wall portion. A substantially rectangular shaped insertion hole 14 is formed through a vehicle width direction outer side end portion of the vehicle front side wall of the stay 12. The insertion hole 14 is open toward the upper side.

Inside the stay 12, an elongated wall-shaped reinforcement rib 16 is integrally formed further to the vehicle width direction inner side than the insertion hole 14 and serves as a reinforcement section and an engagement section. The reinforcement rib 16 reinforces the stay 12. The reinforcement rib 16 extends out from a lower wall of the stay 12 toward the upper side, and an upper face of the reinforcement rib 16 is disposed horizontally at a position coplanar with the upper face of the stay 12. The reinforcement rib 16 is inclined in a direction toward the vehicle rear on progression upward, and the reinforcement rib 16 is disposed parallel to the vehicle rear side wall of the stay 12 except for at a vehicle width direction inner side end portion. The vehicle width direction inner side end portion of the reinforcement rib 16 extends in a direction toward the vehicle front on progression inward in the vehicle width direction, and is coupled to a vehicle front side end portion of the vehicle width direction inner side end wall of the stay 12. The reinforcement rib 16 is disposed so as to avoid a swing center of the stay 12. A housing cavity 18 having a parallelogram-shaped cross-section and serving as a housing section is formed between the reinforcement rib 16 and the vehicle rear side wall and vehicle width direction inner side end wall of the stay 12. The housing cavity 18 is open toward the upper side.

When molding the stay 12 (including the reinforcement rib 16), a mold for molding the interior of the stay 12 (including the reinforcement rib 16) is removed diagonally upward toward the vehicle rear.

A rectangular box shaped camera cover 20 that is made from metal and serves as an attachment body is integrally formed with the stay 12 at the vehicle width direction outer side. An axial direction of the camera cover 20 is inclined in a downward direction on progression toward the vehicle rear, and the interior of the camera cover 20 is open toward the vehicle rear side. When molding the camera cover 20, a mold for molding the interior of the camera cover 20 is removed diagonally downward toward the vehicle rear.

A substantially rectangular block shaped camera module 22, serving as an imaging unit, is housed inside the camera cover 20. The camera cover 20 covers the camera module 22 from the upper side, the lower side, the vehicle width direction inner side, the vehicle width direction outer side, and the vehicle front side. The camera module 22 is fastened to a vehicle front side wall of the camera cover 20, serving as an attachment section, thereby attaching the camera module 22 to the vehicle front side wall of the camera cover 20 inside the camera cover 20. A lens of the camera module 22 faces toward the vehicle rear side (diagonally downward toward the rear), and the camera module 22 is configured to image an area to the rear side of the vehicle.

A harness 24 (including a connector 24A), serving as wiring, is electrically connected to the camera module 22. The harness 24 passes through the vehicle front side wall of the camera cover 20 and is inserted through the insertion hole 14 so as to be laid out in the stay 12. The harness 24 is housed (laid out) in the housing cavity 18 inside the stay 12. The harness 24 passes through the lower wall of the stay 12 at the vehicle width direction inner side end portion (swing center) of the stay 12, and is electrically connected to a controller (not illustrated in the drawings) in the vehicle. The camera module 22 accordingly images the area to the rear side of the vehicle under the control of the controller.

A monitor (not illustrated in the drawings), serving as a display unit, is electrically connected to the controller. Images imaged by the camera module 22 are displayed on the monitor under the control of the controller. The monitor is disposed inside a vehicle cabin, and visual recognition of the vehicle rear side by an occupant is assisted by the vehicle occupant checking the images displayed on the monitor (the images imaged by the camera module 22).

The stay 12 (including the reinforcement rib 16) secures the necessary section modulus with respect to load input to the stay 12 and the camera cover 20. The section modulus of the stay 12 becomes greater on progression from the vehicle width direction outer side toward the vehicle width direction inner side. An vertical direction dimension of the stay 12 is set to the minimum dimension capable of securing the necessary section modulus, with a vertical direction dimension of the interior of the stay 12 (including the housing cavity 18) being a diameter dimension of the harness 24 or greater. The vertical direction dimension of the stay 12 is smaller than both a vertical direction dimension of the camera cover 20 and a vertical direction dimension of the camera module 22.

A visor (not illustrated in the drawings), serving as a covering member, covers substantially the entirety of the stay 12, the camera cover 20, and the camera module 22. The lens of the camera module 22 is exposed to the outside of the visor. The visor is fixed to the stay 12 and the camera cover 20, and load is input to the stay 12 and the camera cover 20 through the visor.

Next, explanation follows regarding operation of the present exemplary embodiment.

In the imaging device 10 configured as described above, the stay 12 is supported at the side door of the vehicle, and the camera module 22 is attached to the camera cover 20.

Note that the stay 12 and the camera cover 20 are integrally molded together. This thereby enables the imaging device 10 to be configured simply.

Moreover, the camera module 22 is covered by the camera cover 20 from the upper side, the lower side, the vehicle width direction inner side, the vehicle width direction outer side, and the vehicle front side. Input of load to the camera module 22 is thereby limited by the camera cover 20, enabling the camera module 22 to be protected.

Furthermore, a height direction dimension of the camera cover 20 is set larger than the height direction dimension of the camera module 22, and the camera cover 20 projects out further than the camera module 22 on both sides in the height direction. A width direction dimension (vehicle width direction dimension) of the camera cover 20 is set larger than the width direction dimension (vehicle width direction dimension) of the camera module 22, and the camera cover 20 projects out further than the camera module 22 on both sides in the width direction. Accordingly, the input of load to the camera module 22 can be effectively limited by the camera cover 20, and the camera module 22 can be effectively protected.

Moreover, the harness 24 of the camera module 22 is housed in the housing cavity 18 inside the stay 12, and the reinforcement rib 16 on the vehicle front side of the housing cavity 18 is inclined in a direction toward the vehicle rear on progression upward. Accordingly, the harness 24 engages with the reinforcement rib 16 in the vertical direction, thus enabling movement of the harness 24 toward the upper side to be suppressed, and enabling the harness 24 to be suppressed from coming out of the housing cavity 18.

Moreover, the vertical direction dimension of the stay 12 is set smaller than the vertical direction dimension of the camera cover 20 and the vertical direction dimension of the camera module 22. Accordingly, the surface area of the stay 12 as viewed face-on from the vehicle front can be made smaller, enabling air resistance caused by the stay 12 during vehicle travel to be diminished.

Moreover, the vertical direction dimension of the stay 12 is set to the minimum dimension capable of securing the necessary section modulus with respect to load input to the stay 12, the camera cover 20, and the camera module 22, with the vertical direction dimension of the interior of the stay 12 (including the housing cavity 18) being the diameter dimension of the harness 24 or greater. This thereby enables the surface area of the stay 12 as viewed face-on from the vehicle front to be made even smaller, enabling air resistance caused by the stay 12 during vehicle travel to be diminished even further.

Moreover, the upper face of the stay 12 is disposed along the lower face of the stay 12. Specifically, the upper face and the lower face of the stay 12 are parallel to each other, and are disposed horizontally. Accordingly, the vertical direction dimension (thickness dimension) of the stay 12 can be made smaller, and the surface area of the stay 12 as viewed face-on from the vehicle front can be made yet smaller, enabling air resistance caused by the stay 12 during vehicle travel to be diminished yet further.

Second Exemplary Embodiment

FIG. 3A to FIG. 3C, and FIG. 4A and FIG. 4B illustrate an imaging device 30 according to a second exemplary embodiment of the present invention.

The imaging device 30 according to the present exemplary embodiment has substantially the same configuration as the first exemplary embodiment, but differs in the following points.

Figure 3A:
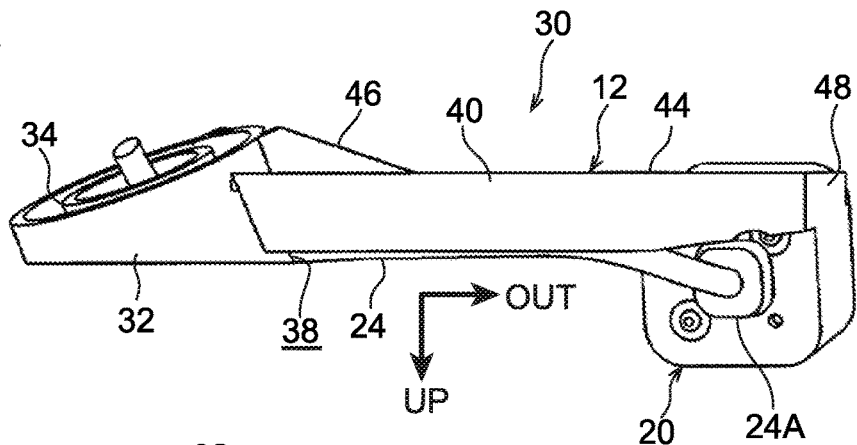
FIG. 3A is a back face view illustrating an imaging device according to a second exemplary embodiment of the present invention as viewed from the vehicle front.
Figure 3B:
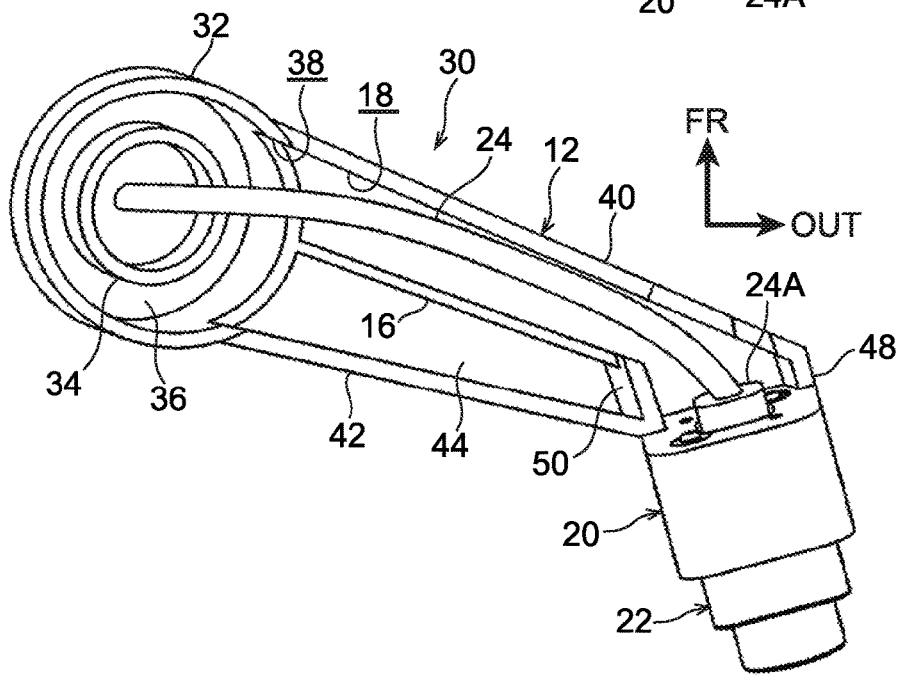
FIG. 3B is a plan view illustrating an imaging device according to the second exemplary embodiment of the present invention as viewed from above.
Figure 3C:
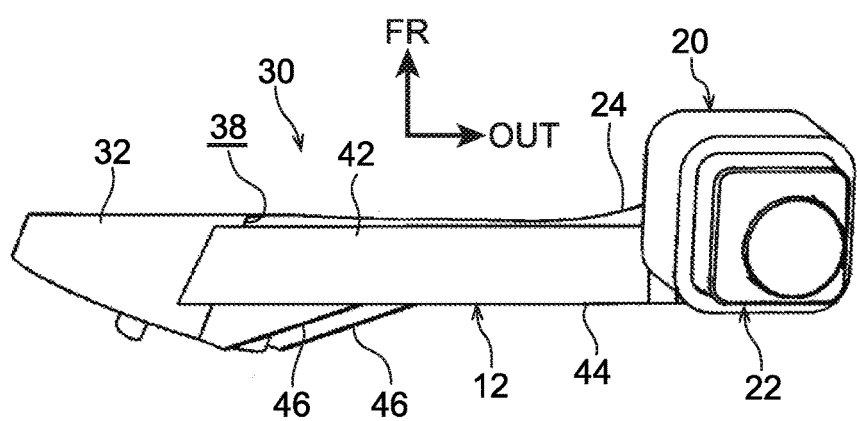
FIG. 3C is a face-on view illustrating an imaging device according to the second exemplary embodiment of the present invention as viewed from the vehicle rear.
Figure 4A:
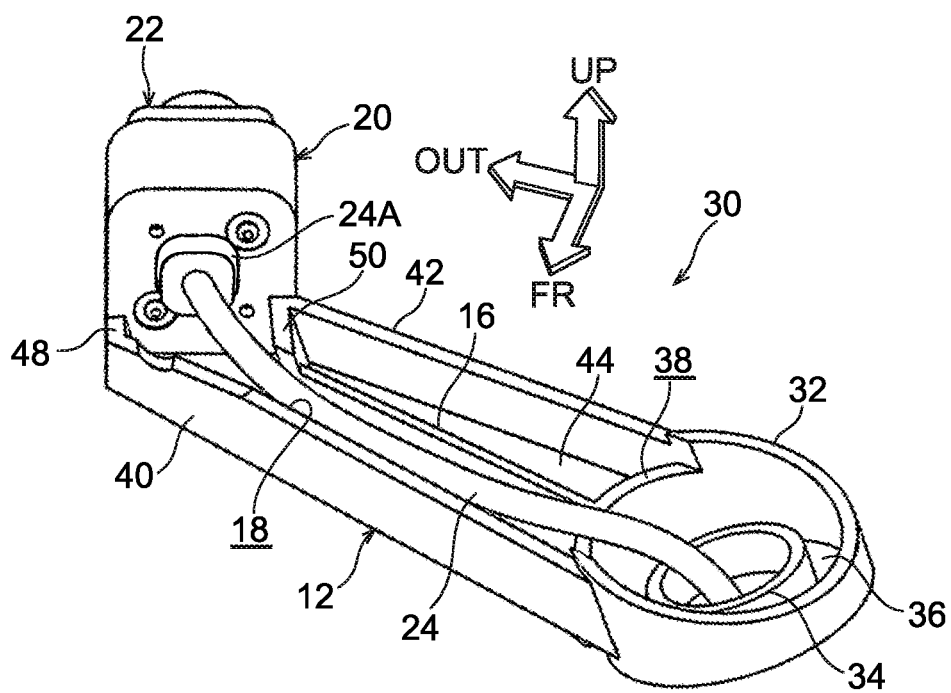
FIG. 4A is a perspective view illustrating an imaging device according to the second exemplary embodiment of the present invention as viewed diagonally from a vehicle upper front.
Figure 4B:
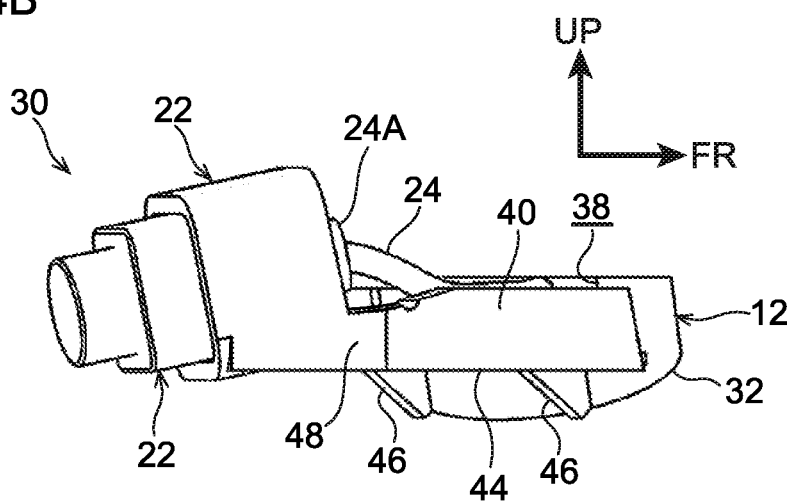
FIG. 4B is a side view of an imaging device according to the second exemplary embodiment of the present invention as viewed from the vehicle width direction outer side (vehicle right side).

As illustrated in FIG. 3A to FIG. 3C, and in FIG. 4A and FIG. 4B, in the imaging device 30 according to the present exemplary embodiment, a circular tube shaped support tube 32 and an insertion tube 34, together serving as a supported section, are provided coaxially to a vehicle width direction inner side end portion of the stay 12. The insertion tube 34 is disposed at a radial direction inner side of the support tube 32. A circular ring shaped coupling wall 36 is provided coaxially to and between the support tube 32 and the insertion tube 34. The coupling wall 36 couples an axial direction intermediate portion of the support tube 32 and an axial direction intermediate portion of the insertion tube 34 together. The axial direction of both the support tube 32 and the insertion tube 34 is inclined outward in the vehicle width direction on progression upward, and a lower face of the support tube 32 and a lower face of the insertion tube 34 are disposed perpendicular to the axial direction, and are also disposed at positions coplanar with each other. An upper face of the support tube 32 is disposed horizontally, and an upper face of the insertion tube 34 is disposed perpendicular to the axial direction. The upper face of the insertion tube 34 is disposed at a lower side of the upper face of the support tube 32. The support tube 32 and the insertion tube 34 are attached to the side door, such that the stay 12 is supported at the side door (vehicle body side) so as to be capable of swinging in the vehicle front-rear direction.

A communication hole 38 with a rectangular profile as viewed face-on is formed in a vehicle width direction outer side end portion of a peripheral wall of the support tube 32. The communication hole 38 penetrates the peripheral wall of the support tube 32. The communication hole 38 is open toward the upper side, and a lower face of the communication hole 38 is disposed horizontally.

A vehicle front side wall and a vehicle rear side wall of the stay 12 further to the vehicle width direction outer side than the support tube 32 respectively configure a front wall 40 and a rear wall 42. The front wall 40 and the rear wall 42 are disposed vertically. An upper face of the front wall 40 and an upper face of the rear wall 42 are disposed horizontally, with the exception of at a vehicle width direction outer side end portion of the front wall 40. The upper face of the vehicle width direction outer side end portion of the front wall 40 is inclined in a direction toward the lower side on progression toward the vehicle width direction outer side. The upper faces of the front wall 40 and the rear wall 42 are disposed at the lower side of the upper face of the support tube 32 and at the upper side of the lower face of the communication hole 38 in the support tube 32. The front wall 40 and the rear wall 42 are coupled to the support tube 32 at a peripheral direction outer side of the communication hole 38, and the front wall 40 and the rear wall 42 extend in a direction toward the vehicle rear on progression outward in the vehicle width direction. The front wall 40 is not formed with the insertion hole 14 of the first exemplary embodiment.

A lower wall of the stay 12 further to the vehicle width direction outer side than the support tube 32 configures a lower wall 44. The lower wall 44 (an upper face and a lower face thereof) is disposed horizontally. A predetermined number of trapezoid shaped reinforcement plates 46 (two in the present exemplary embodiment) are integrally provided between the lower wall 44 and the support tube 32. The reinforcement plates 46 couple the lower wall 44 and the support tube 32 together, reinforcing the stay 12.

The reinforcement rib 16 inside the stay 12 is disposed vertically at the upper side of the lower wall 44. The reinforcement rib 16 is coupled to the support tube 32, and an upper face of the reinforcement rib 16 is disposed so as to be coplanar with a lower face of the communication hole 38 in the support tube 32. The housing cavity 18 inside the stay 12 is formed between the reinforcement rib 16 and the front wall 40. The housing cavity 18 has a rectangular shaped cross-section.

An outwardly extending wall 48 is coupled to a vehicle width direction outer side end of the front wall 40. The outwardly extending wall 48 extends from the vehicle width direction outer side end of the front wall 40 toward the vehicle rear side. The outwardly extending wall 48 is inclined in a direction heading outward in the vehicle width direction on progression upward. An upper face of the outwardly extending wall 48 is disposed horizontally, further to the lower side than the front wall 40.

An inwardly extending wall 50, serving as a reinforcement section and an engagement section, is coupled to a vehicle width direction outer side end of the rear wall 42. The inwardly extending wall 50 extends out from the vehicle width direction outer side end of the rear wall 42 toward the vehicle front side. The inwardly extending wall 50 is coupled to the vehicle width direction outer side end of the reinforcement rib 16. The inwardly extending wall 50 reinforces the stay 12 together with the reinforcement rib 16. The inwardly extending wall 50 extends out from the lower wall 44 toward the upper side, and an upper face of the inwardly extending wall 50 is coplanar with the upper face of the rear wall 42. The inwardly extending wall 50 is inclined in a direction heading outward in the vehicle width direction on progression upward, and the inwardly extending wall 50 is disposed parallel to the outwardly extending wall 48. The housing cavity 18 in the stay 12 is also formed between the outwardly extending wall 48 and the inwardly extending wall 50. The housing cavity 18 has a parallelogram shaped cross-section between the outwardly extending wall 48 and the inwardly extending wall 50.

When molding the stay 12 (including the outwardly extending wall 48 and the inwardly extending wall 50), a mold that molds a portion of the stay 12 between the outwardly extending wall 48 and the inwardly extending wall 50 is removed toward the vehicle width direction outer side and upper side.

The camera cover 20 is integrally formed with a vehicle rear side of a vehicle width direction outer side end portion of the stay 12. A lower portion of the vehicle front side wall of the camera cover 20 is integrated to the stay 12 at a vehicle rear side end of the outwardly extending wall 48 and the vehicle width direction outer side end (vehicle rear side end) of the rear wall 42. A lower wall of the camera cover 20 is integrated to the stay 12 at a vehicle width direction outer side end portion (vehicle rear side end portion) of the lower wall 44.

The harness 24 that is electrically connected to the camera module 22 is laid out inside the stay 12. The harness 24 is housed (laid out) inside the housing cavity 18, and is inserted into the insertion tube 34 through the communication hole 38 in the support tube 32.

The present exemplary embodiment is capable of exhibiting similar operation and advantageous effects to those of the first exemplary embodiment described above.

In particular, the harness 24 of the camera module 22 is housed in the housing cavity 18 inside the stay 12, and the inwardly extending wall 50 at the vehicle width direction inner side of the housing cavity 18 is inclined in a direction outward in the vehicle width direction on progression upward. The harness 24 thus engages with the inwardly extending wall 50 in the vertical direction, thereby suppressing movement of the harness 24 toward the upper side, and suppressing the harness 24 from coming out of the housing cavity 18.

Moreover, the upper faces of the front wall 40 (excluding the vehicle width direction outer side end portion thereof) and the rear wall 42 of the stay 12 are disposed along the lower face of the lower wall 44. Specifically, in the stay 12, the upper faces of the front wall 40 (excluding the vehicle width direction outer side end portion thereof) and the rear wall 42, and the lower face of the lower wall 44 are parallel to each other, and are disposed horizontally. This thereby enables a vertical direction dimension (thickness dimension) of the stay 12 to be made smaller between the reinforcement plates 46 of the stay 12 and the camera cover 20, and enables the surface area of the stay 12 as viewed face-on from the vehicle front to be made smaller, enabling air resistance caused by the stay 12 during vehicle travel to be diminished.

Moreover, vehicle front side faces of the camera cover 20 and the camera module 22 are disposed at the vehicle rear side of a vehicle front side face of the stay 12. Accordingly, during vehicle travel, travel wind flowing along the vehicle front side face of the stay 12 to the vehicle width direction outer side can be suppressed from colliding with vehicle width direction inner side faces of the camera cover 20 and the camera module 22, thus enabling air resistance caused by the camera cover 20 and the camera module 22 to be diminished.

Note that in the first exemplary embodiment and the second exemplary embodiment described above, the stay 12 and the camera cover 20 are integrally molded together. However, the stay 12 and the camera cover 20 may be integrated by joining the stay 12 and the camera cover 20 to one another.

Moreover, in the first exemplary embodiment and the second exemplary embodiment described above, the camera cover 20 covers the upper side, the lower side, the vehicle width direction inner side, the vehicle width direction outer side, and the vehicle front side of the camera module 22. However, it is sufficient for the camera cover 20 to cover at least one side of the camera module 22. It is particularly preferable for the camera cover 20 to cover the vehicle front side (back face side) of the camera module 22, and for the camera cover 20 to cover the vehicle width direction outer side of the camera module 22.

Furthermore, in the first exemplary embodiment and the second exemplary embodiment described above, the camera module 22 is fixed to the camera cover 20 and is not capable of moving. However, the camera module 22 may be capable of moving (for example swinging) with respect to the camera cover 20.

Moreover, in the first exemplary embodiment and the second exemplary embodiment described above, the camera module 22 is capable of imaging an area to the rear side of the vehicle. However, the camera module 22 may be configured capable of imaging in other directions (for example to the lower side, upper side, vehicle width direction inner side, vehicle width direction outer side, or vehicle front side).

Moreover, in the first exemplary embodiment and the second exemplary embodiment described above, the upper faces of the camera cover 20 and the camera module 22 may be disposed at a lower side of the upper face of the stay 12. So doing increases a range in which the camera cover 20 and the camera module 22 overlap with the stay 12 in the field of view of an occupant, thereby enabling a reduction caused by the camera cover 20 and the camera module 22 in the field of view of the occupant to be suppressed.

Moreover, in the first exemplary embodiment and the second exemplary embodiment described above, the stay 12 supports the single camera module 22. However, the stay 12 may support plural of the camera modules 22. In such cases, the camera cover 20 may cover the respective camera modules 22. Moreover, in such cases, coupling the stay 12 between the camera modules 22 enables the support rigidity of the plural camera modules 22 by the stay 12 to be raised.

Moreover, in the first exemplary embodiment and the second exemplary embodiment described above, the imaging device 10, 30 is installed on the side door of the vehicle. However, the imaging device 10, 30 may be installed at a location other than the side door of the vehicle.

The disclosure of Japanese Patent Application No. 2014-260485, filed on Dec. 24, 2014, is incorporated in its entirety by reference herein.

EXPLANATION OF THE REFERENCE NUMERALS 10 imaging device
12 stay (support body)
18 housing cavity (housing section)
20 camera cover (attachment body)
22 camera module (imaging unit)
24 harness (wiring)
30 imaging device

The invention claimed is:

1. An imaging device, comprising:
a support body having one end that is supported by a vehicle body side section and another end that extends out toward a vehicle width direction outer side;
an attachment body that is integrally formed with the another end side of the support body;
an imaging unit that is attached to the attachment body and that is configured to perform imaging;
wiring that is connected to the imaging unit;
a housing section that is provided at the support body, that does not pass through the attachment body, that houses the wiring, and that is open toward an upper side along its entire length in a length direction of the wiring; and
a reinforcement section that is disposed inside a peripheral wall of the support body so as to form the housing section, and that is integrally provided at a lower wall of the support body and integrally coupled to the peripheral wall of the support body so as to reinforce the support body.

2. The imaging device of claim 1, wherein the attachment body covers the imaging unit.

3. The imaging device of claim 1, wherein the wiring is configured to engage with a side face of the housing section in a vertical direction.

4. The imaging device of claim 1, wherein a vertical direction dimension of the support body is smaller than a vertical direction dimension of the imaging unit.

5. The imaging device of claim 1, wherein an upper face of the support body is disposed along a lower face of the support body.

6. The imaging device of claim 1, wherein the imaging unit is disposed at a vehicle rear side of a vehicle front side face of the support body.

7. The imaging device of claim 1, wherein the imaging unit is disposed at a lower side of an upper face of the support body.

8. The imaging device of claim 1, wherein the imaging device comprises a plurality of the imaging units, and the support body is disposed between the imaging units.

9. The imaging device of claim 1, wherein the support body has an open box-shaped interior.

10. The imaging device of claim 1, wherein a communication hole is provided in a peripheral wall of a support tube provided at the support body.

11. The imaging device of claim 1, wherein the support body is supported at a vehicle body side so as to be capable of swinging in a vehicle front-rear direction.

12. The imaging device of claim 1, wherein the peripheral wall of the support body extends from the support body at a different angle than the lower wall.

13. The imaging device of claim 1, wherein the reinforcement section includes a rib that extends from the lower wall of the support body.

* * * * *